United States Patent [19]

Mailliet et al.

[11] Patent Number: 5,119,743
[45] Date of Patent: Jun. 9, 1992

[54] DEVICE FOR INJECTING PREHEATED AIR INTO A SHAFT FURNACE

[75] Inventors: Pierre Mailliet, Howald; Jean Benck, Dudelange, both of Luxembourg

[73] Assignee: Paul Wurth S.A., Luxembourg, Luxembourg

[21] Appl. No.: 667,307

[22] Filed: Mar. 8, 1991

[30] Foreign Application Priority Data

Apr. 27, 1990 [LU] Luxembourg .......................... 87 730

[51] Int. Cl.⁵ .............................................. F23L 5/00
[52] U.S. Cl. .................................. 110/182.5; 432/99; 122/6.6
[58] Field of Search ............... 432/99, 77; 110/182.5; 122/6.6; 266/186

[56] References Cited

U.S. PATENT DOCUMENTS

| 3,766,868 | 10/1973 | Mahr ........................... 110/182.5 |
| 4,023,832 | 5/1977 | Legille et al. ................. 110/182.5 |
| 4,212,253 | 7/1980 | Voituriez et al. ............... 122/6.6 |
| 4,940,005 | 7/1990 | Solvi ........................... 432/99 |
| 4,987,838 | 1/1991 | Malbiet et al. ................. 432/99 |

FOREIGN PATENT DOCUMENTS

| 2517472 | 10/1976 | Fed. Rep. of Germany . |
| 2525946 | 12/1976 | Fed. Rep. of Germany . |
| 3146305 | 5/1983 | Fed. Rep. of Germany . |
| 3221070 | 8/1983 | Fed. Rep. of Germany . |
| 2284081 | 4/1976 | France . |
| 246346 | 1/1926 | United Kingdom . |
| 1170953 | 11/1969 | United Kingdom . |
| 2055165 | 1/1981 | United Kingdom . |

Primary Examiner—Henry C. Yuen
Attorney, Agent, or Firm—Fishman, Dionne & Cantor

[57] ABSTRACT

The device comprises an oblique portion connected by a gooseneck, a nozzle, atuyere and a ball-and-socket joint to the wall of the furnace, in which the oblique portion comprises a tapered tube flange-mounted by its upper part onto an upper connection piece forming part of a bustle pipe and the lower part of which dips axially into a lower connection piece integral with the gooseneck, a bellows expansion joint and tension rods ensuring the mechanical connection between the tapered tube and the lower connection piece. The lower connection piece and the tapered tube can move mutually in the axial direction and have means for limiting their radial mobility.

8 Claims, 7 Drawing Sheets

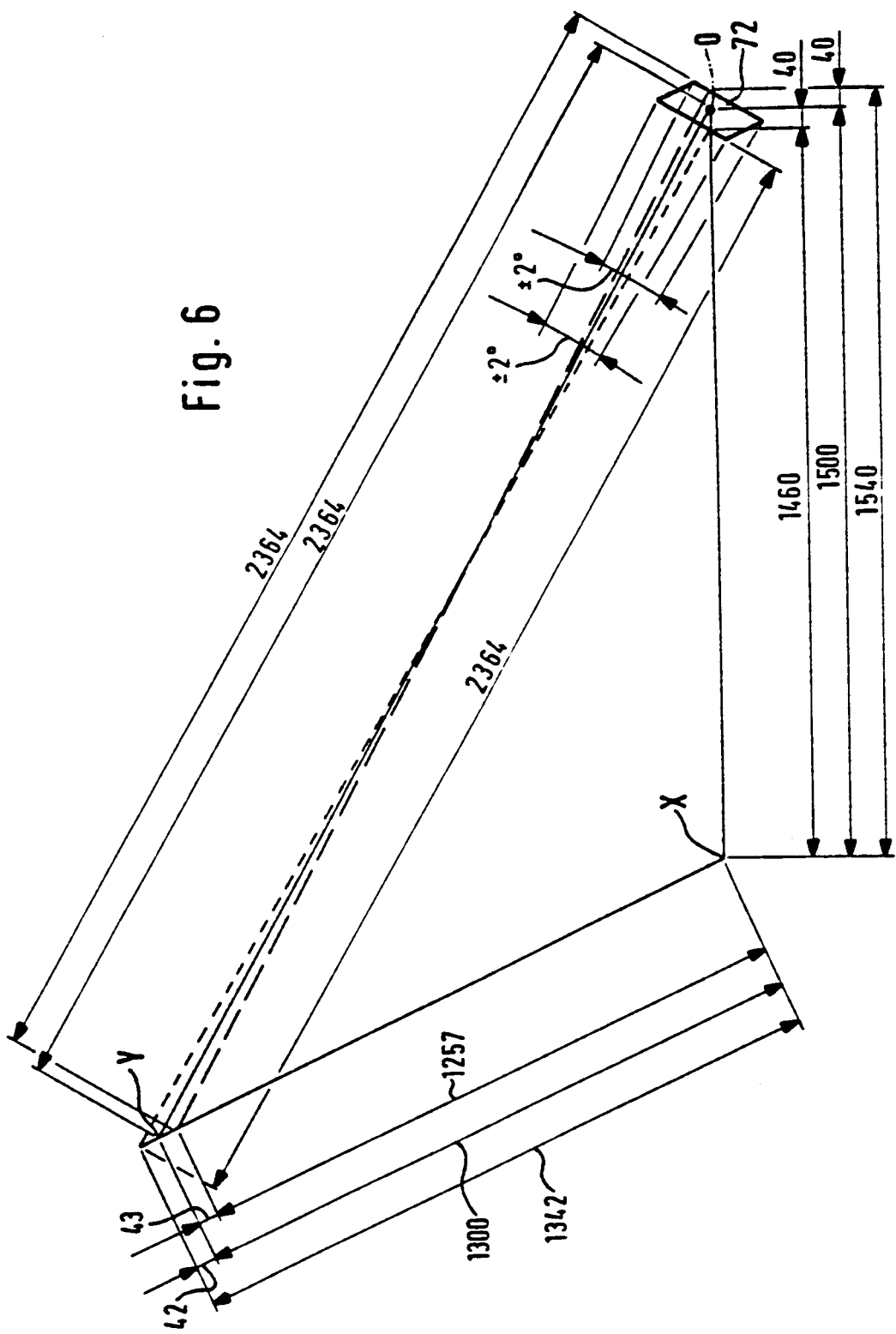

DEVICE FOR INJECTING PREHEATED AIR INTO A SHAFT FURNACE

TECHNICAL FIELD

The present invention relates to a device for injecting preheated air into a shaft furnace.

Background of the Invention

Devices for injection preheated air into a shaft furnace, more generally known under the name of "blast connection", are subject to problems of mobility and sealing. Indeed, as a result of the high temperature of the preheated air (temperature of the order of 1200° C. or more) and of the high temperature prevailing inside the furnace, the wall of the latter and the bustle pipe and the blast connection are subject to thermal expansions and deformations causing significant relative displacements between the bustle pipe and the wall of the furnaces. The blast connection must therefore be capable of compensating for these relative displacements or of adapting to them, at the same time avoiding leaks of gas or preheated air to the outside.

In addition to these stresses of thermal origin, there are stresses caused by the internal pressures. Indeed, the preheated air which is injected through the blast connection into the furnace is, in particular in modern furnaces, at a high pressure which, given the sections presently adopted, subjects the blast connection to forces of the order of several tons, which pressures come from both the blast pipe and the inside of the furnace.

The known blast connections designed in order to meet these requirements comprise either two points of articulation or three points of articulation with, in each case, a ball-and-socket joint generally between the tuyere and the nozzle, the other articulation, or the two other articulations, depending on the type, being situated in the oblique portion connecting the bustle pipe to the gooseneck of the blast connection.

The articulations in the oblique portion are generally provided with a flexible sealing pad and with a bellows expansion joint joining together the movable portions.

The blast connections with three points of articulation, disclosed, for example, in the U.S. Pat. No. 3,766,868, generally have the advantage as compared with those with two points of articulation of having more possibilities of adapting to, or compensating for the deformations and stresses, both of the radial components and the axial components. The two articulations situated in the oblique portion of these blast connections generally comprise means, such as universal joints, which have the advantage of absorbing the force components generated by the pressure of the hot air in such a way that these forces are not transmitted to the articulation between the nozzle and the tuyere. However, these blast connections with three points of articulation have the disadvantage of being relatively expensive, which is of no little importance in the light of the large number of blast connections with which a blast furnace is equipped.

The blast connections with two articulations, disclosed, for example, in the document DE-GBM 7325087, have for their part the advantage of being simpler and less expensive. However, these blast connections are much more sensitive to the stresses and deformations, in particular to the radial components which cause the sealing pad of the articulation in the oblique portion to be crushed, and more rapid wear.

The blast connection proposed in the above mentioned document is, furthermore, subjected to the forces caused by the pressure of the hot air. In order to prevent these forces from causing the articulation between the nozzle and the tuyere to come out of joint with concomitant leaks, the oblique portion of this blast connection must be attached to the wall of the furnace. The location of this attachment is not, however, ideal owing to the excessively large displacements of the blast connection and owing to the difficulty of access to it.

SUMMARY OF THE INVENTION

The object of the present invention is to provide a novel device for injecting preheated air into a shaft furnace which is relatively simple and inexpensive and which adapts satisfactorily to deformations and stresses.

In order to achieve this objective, the device proposed by the present invention includes a plurality of separate elements, each consisting of an external armoring and an internal refractory lining, and comprising an oblique portion connected by a gooseneck, a nozzle, a tuyere and a ball-and-socket joint to the wall of the furnace, in which the oblique portion comprises a tapered tube flange-mounted by its upper part onto an upper connection piece forming part of a bustle pipe and the lower part of which dips axially into a lower connection piece integral with the gooseneck, a bellows expansion joint ensuring the sealing between the tapered tube and the lower part, and tension rods ensuring the mechanical connection between the tapered tube and the lower connection piece and is essentially characterized in that the lower connection piece and the tapered tube can move mutually in the axial direction and have means for limiting their radial mobility.

In other words, the problems of mastering the radial components of the forces, and the displacements which caused the sealing pad to be crushed at the articulation of certain blast connections according to the prior art are eliminated using means for limiting the radial or angular mobility of the tapered tube and of the lower connection piece, and compensated for by a relative axial mobility, or telescoping, of these two elements.

It has been established that, if these means are designed to prevent an axial misalignment of more than 2° between the tapered tube and the lower connection piece, satisfactory results can be foreseen.

According to a first embodiment, these means consist of two flanks integral with a flange of the upper connection piece which extend laterally, when viewed in the direction of the furnace, on either side of the expansion joint and are guided in corresponding recesses of a flange of the lower connection piece.

According to a second embodiment, these means consist of an internal guide ring integral with an upper flange of the lower connection piece and surrounding the lower cylindrical part of the tapered tube.

The sealing at the level of the ball-and-socket joint between the nozzle and the tuyere can be maintained by a pair of tension rods with adjustable springs tensioned between the wall of the furnace and the nozzle or the gooseneck.

These tension rods are preferably arranged in such a way that their axis forms an acute angle, towards the bottom, with respect to the axis of the nozzle.

BRIEF DESCRIPTION OF THE DRAWINGS

Other features and characteristics will emerge from the detailed description of an advantageous embodiment given below, as an illustration, with reference to the attached drawings, in which:

FIGS. 6 and 6A illustrate diagrammatically the possibilities of movement in the case of a freedom of axial misalignment of 2° between the tapered tube and the lower connection piece.

DETAILED DESCRIPTION OF THE INVENTION

Figure 1:
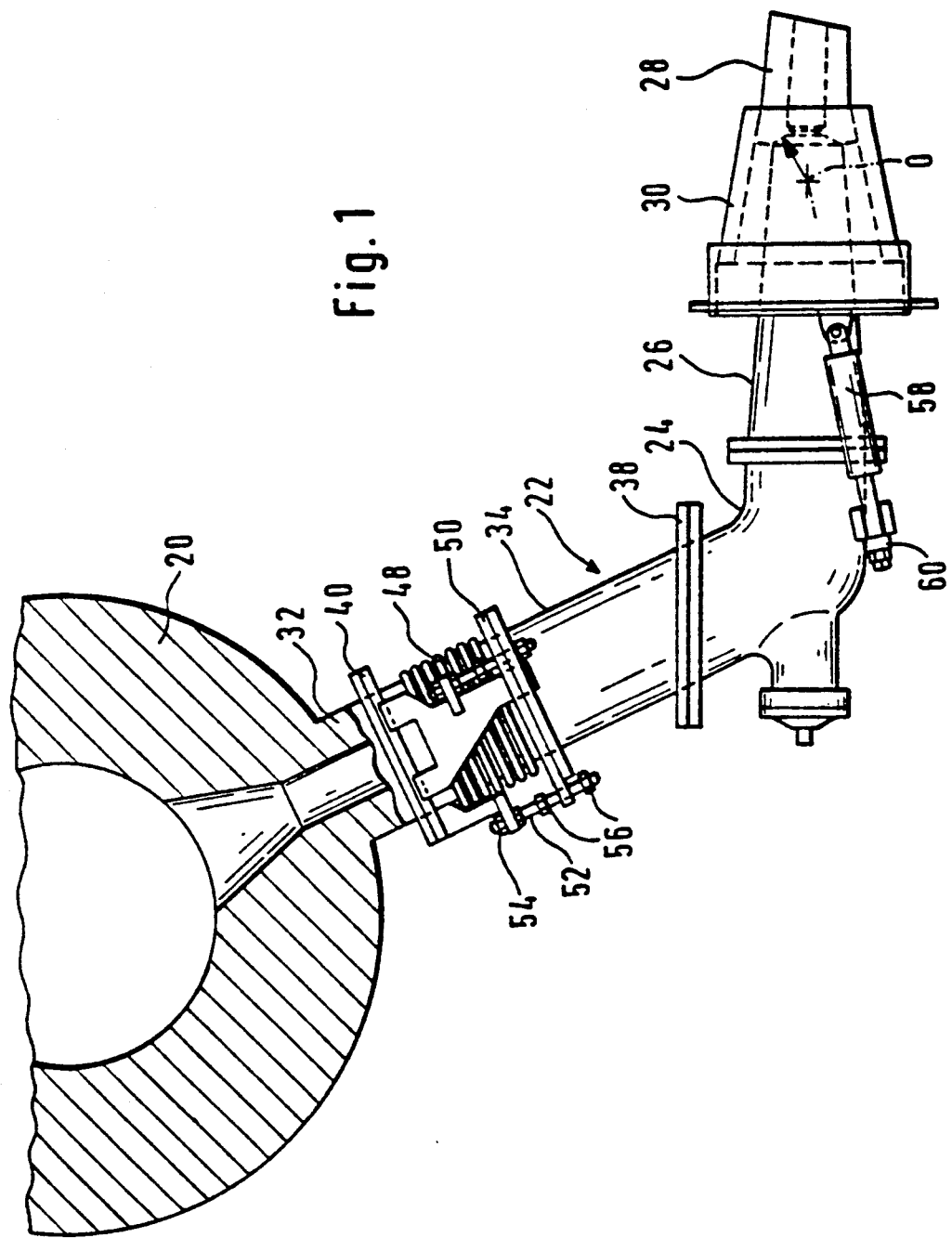
FIG. 1 shows a side view of a blast connection according to the present invention.
Figure 2:
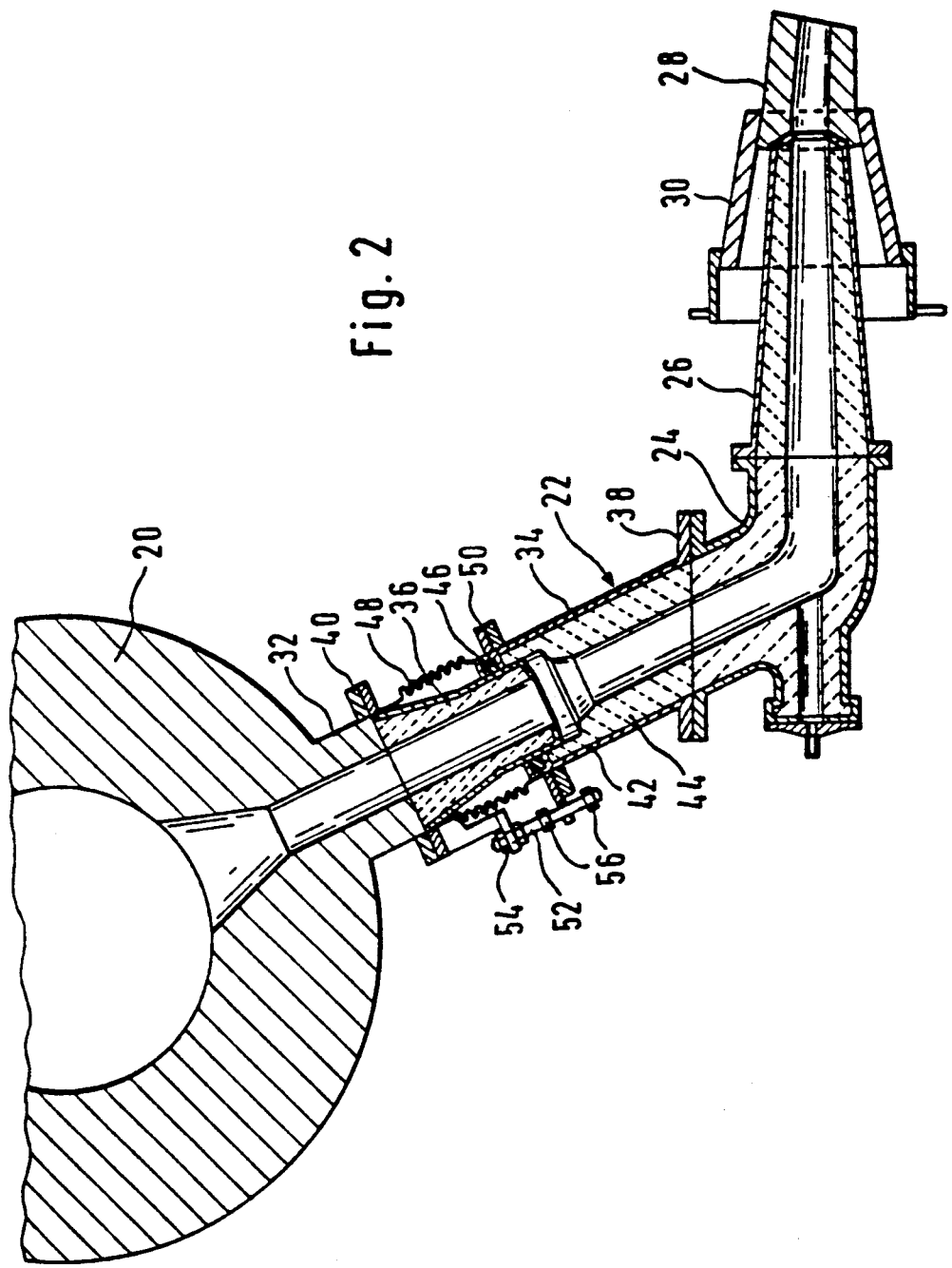
FIG. 2 shows an axial vertical section through the blast connection of FIG. 1.

FIGS. 1 and 2 show diagrammatically a blast connection which connects a main bustle pipe 20 arranged around a blast furnace, not shown, to the wall of the latter with a view to the injection of preheated air into this furnace. This blast connection comprises a descending oblique portion 22 connected via a gooseneck 24 and a nozzle 26 to a tuyere 28 which is keyed in a tymp 30 arranged in the wall of the furnace. The nozzle 26 is connected to the tymp 30 by a ball-and-socket joint, the center of curvature of which is represented by 0. The oblique portion 22 consists of an upper connection piece 32 which forms part of the bustle pipe 20, and of a lower connection piece 34 which is fixed by a flange 38 onto the gooseneck 24. The connection between the upper and lower connection pieces 32 and 34 is ensured by a tapered tube 36 with a lower cylindrical part which is fixed by a flange 40 to the upper connection piece 32 and the lower part of which penetrates coaxially into the upper part of the lower connection piece 34. As shown in FIG. 2, all the elements of the blast connection have an external metal armoring 42 and an internal refractory lining 44.

According to one of the features of the present invention, the portion 22 has a certain degree of telescopic freedom to the extent that the tapered tube 36 can, in its cylindrical region, move axially with respect to the lower connection piece 34, and vice versa. The sealing between these two elements is ensured by an annular sealing pad 46 surrounding the cylindrical part of the tapered tube 36, and a bellows expansion joint 48 extending from the upper flange 40 to a flange 50 of the lower connection piece 34. Three external tension rods 52 ensure the mechanical stability of the blast connection and relax the expansion joint 48 when the blast connection is being disassembled. For this purpose, the tension rods 52 are fixed via a nut and a counter-nut to a plate 54 integral with the upper flange 40, and extend through the flange 50 of the lower connection piece, while at the same permitting a relative axial sliding between the tension rods 52 and the flange 50 within the limits fixed by adjusting nuts 56.

In order to avoid leaks at the ball-and-socket joint between the nozzle 26 and the tuyere 28, or even to avoid this articulation coming out of joint, a pair of tension rods, only one of which can be seen at 58, are tensioned between the gooseneck 24 and the wall of the furnace. These tension rods 58 comprise a spring, not shown, the tensile load of which can be adjusted by means of a nut 60.

Figure 3:
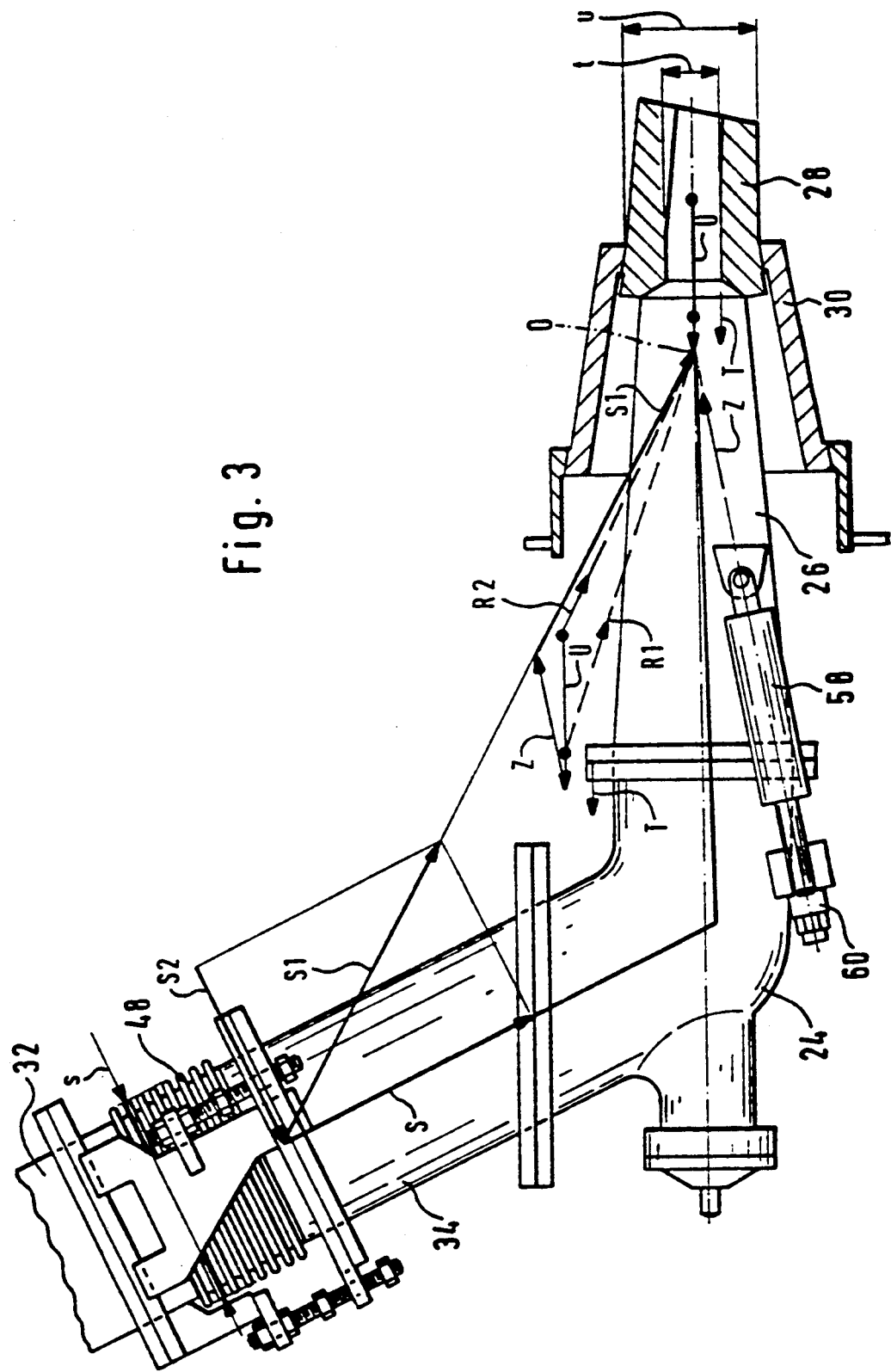
FIG. 3 shows diagrammatically the force components which are present.

FIG. 3 shows a schematic diagram of the forces and their components which are present in a blast connection according to FIGS. 1 and 2. The inside of the blast connection is first subjected to a force caused by the pressure in the bustle pipe 20. This force, represented by S, is exerted axially and is proportional to the pressure and to the mean cross-section of the expansion joint 48. By way of example, if the expansion joint 48 has a mean diameter s of 580 mm, and if the pressure in the bustle pipe is $4 \times 10^5$ Pa, the force S is 10560 daN. Given that the blast connection is not supported in the direction of the force S, the latter must be broken down in such a way that it finds support, in other words in the direction of the center 0 of the articulation between the nozzle 26 and the tuyere 28. This component is represented in FIG. 3 by S1. This inevitable breaking down generates, however, a component S2 which is exerted radially. In the case of the abovementioned example and for the configuration illustrated, the component S1 is of the order of 13000 daN, and the component S2 is of the order of 7000 daN. One of the objectives of the present invention is to provide means, described in more detail subsequently with reference to FIGS. 4 to 5, intended to contain the component S2, since the absence of such means would subject the joint between the tapered tube 36 and the connection piece 34 to radial bending stresses liable to damage the pad 46 and the expansion joint 48.

In FIG. 3, the component S1 has been transferred towards the point 0, given that it is there that it exerts its effect. The direction of the component S1, as shown, is not optimal, given that it stresses the lower part of the ball-and-socket joint directly and is liable to free the upper part of the joint and to cause leaks at this point. Fortunately, however, the orientation of the component S1 is modified under the effects of the action of the tension rods 58 and of the pressure inside the furnace on the nozzle, the direction and the force of this pressure being represented by T in FIG. 3. The force resulting from the action of the tension rods 58 is represented by Z. This component Z, transferred to the beginning of the component S1 and after subtracting the force component due to the pressure T, supplies the resultant R1 which represents the magnitude and the direction of the force exerted on the articulation between the nozzle 26 and the tuyere 28. This resultant R1 has a better orientation than the component S1, to the extent that its angle of inclination with respect to the axis of the nozzle is smaller. It should, moreover, be noted that the orientation of the resultant R1 is proportionally better, the greater the angle of inclination α of the tension rods 58 with respect to the axis of the nozzle 26.

The force of the tension rods 58 is adjusted approximately so as to contain the effect of the pressure on the tuyere 28 from inside the furnace. The force resulting from this pressure is represented by the vector U. When the diameter of the exposed portion of the tuyere 28 is 450 mm, the force U is 6360 daN for a pressure inside the furnace of $4 \times 10^5$ Pa. Consequently, each of the two tension rods 58 will be adjusted so as to exert a force of the order of 3000 daN. By combining the effect of the force of the tension rods Z and the force U with the component S1, the resultant R2 is obtained which is the force of the tuyere 28 on the tymp 30.

Figure 4:
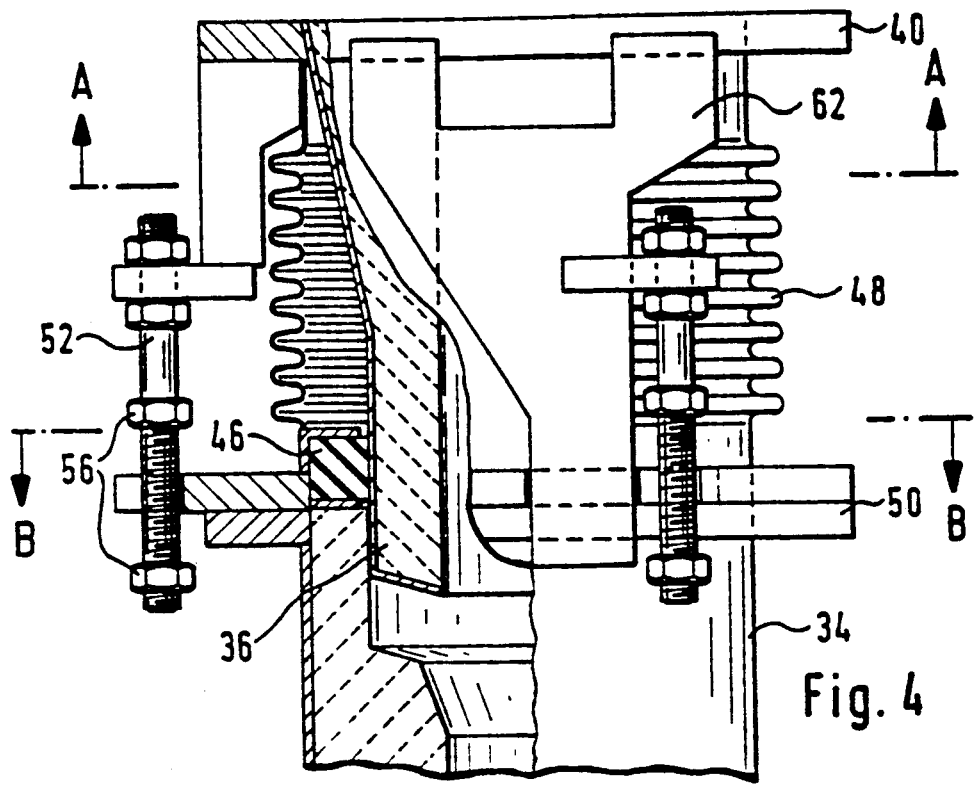
FIG. 4 shows diagrammatically and in partial section a side view of the means for limiting the radial mobility of the tapered tube with respect to the lower connection piece.
Figure 4A:
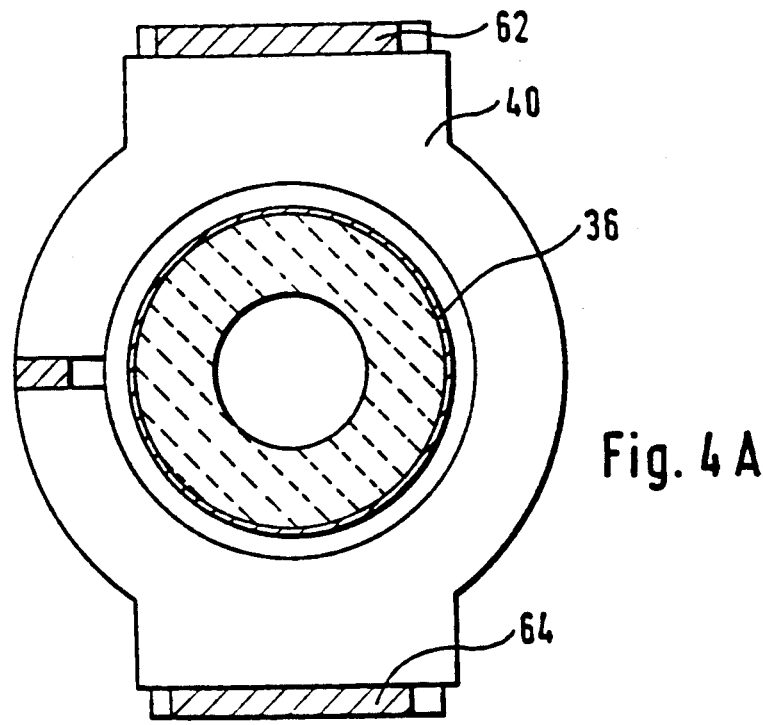
FIG. 4A shows a horizontal section through the plane of section A—A in FIG. 4.
Figure 4B:
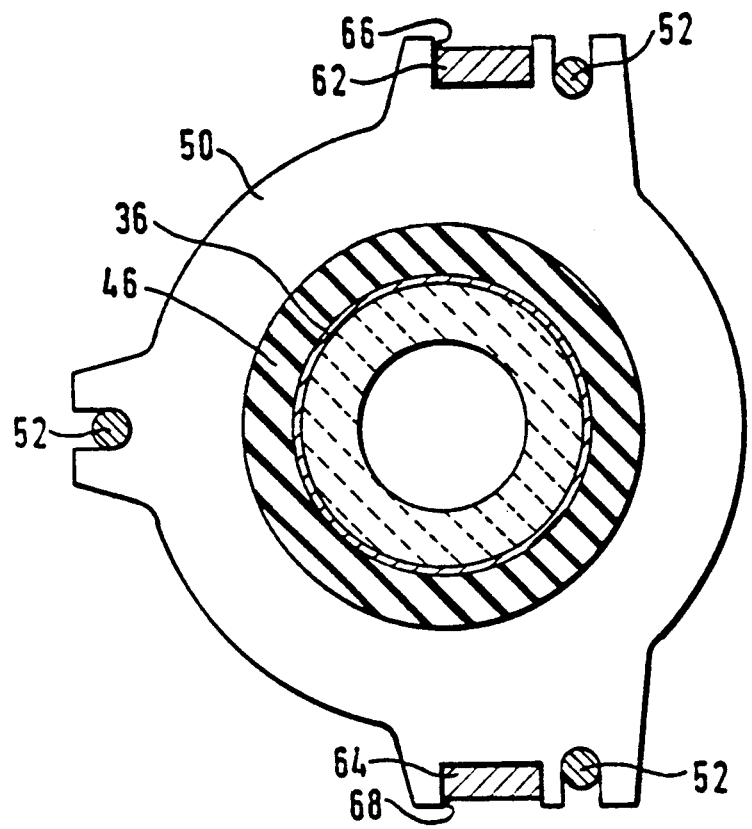
FIG. 4B shows a section through the plane of section B-B in FIG. 4.
Figure 5:
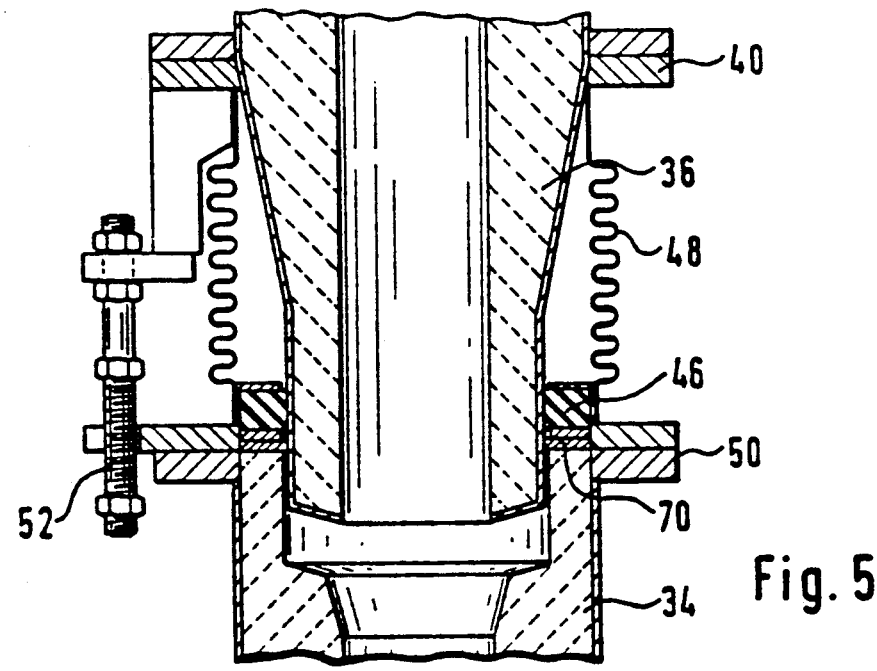
FIG. 5 shows diagrammatically, in axial section, a second embodiment of the means for limiting the radial mobility.

FIG. 4 shows a first embodiment of the means provided by the present invention for containing the radial component S2 of the force S explained with reference to FIG. 3. In this first embodiment, the upper flange 40 has two flanks 62, 64 which extend laterally, when viewed in the direction of the furnace, on either side of the expansion joint 48 and which are guided by their narrowed lower part in two corresponding recesses 66, 68 of the lower flange 50. The guidance of these flanks 62, 64 in the recesses 66, 68 consequently prevents any substantial radial movement of the flange 50 with respect to the flange 40, while at the same time permitting a mutual axial displacement between these two flanges, in other words a certain telescoping between the tapered tube 36 and the connection piece 34. In other words, the radial components of the forces corresponding to the force S2 are transmitted by the flanks 62, 64 to the bustle pipe.

It should, however, be noted that both the guidance of the flanks 62, 64 in the corresponding recesses 66 and 68, and the passage of the tension rods 52 in the flange 50 and the penetration of the tapered tube 36 into the connection piece 34 are effected with a certain play so as to permit an axial misalignment of the order of 2° between the tapered tube 36 and the connection piece 34, which, as will be explained in more detail with reference to FIG. 6, permits degrees of freedom which are reasonable for permitting the blast connection to effect the movements required for compensating for the differential displacements.

In the second embodiment illustrated in FIG. 5S, the external guidance of FIG. 4 is replaced by an internal guidance of the tapered tube 36. This guidance is effected by a ring 70, for example made from silicon carbide, which surrounds the lower cylindrical part of the tube 36. As in the previous case, this ring 70 is arranged with a certain play around the tube 36 so as to compensate for the radial forces but to tolerate an axial misalignment of the order of 2° between the tube 36 and the connection piece 34.

Figure 6:
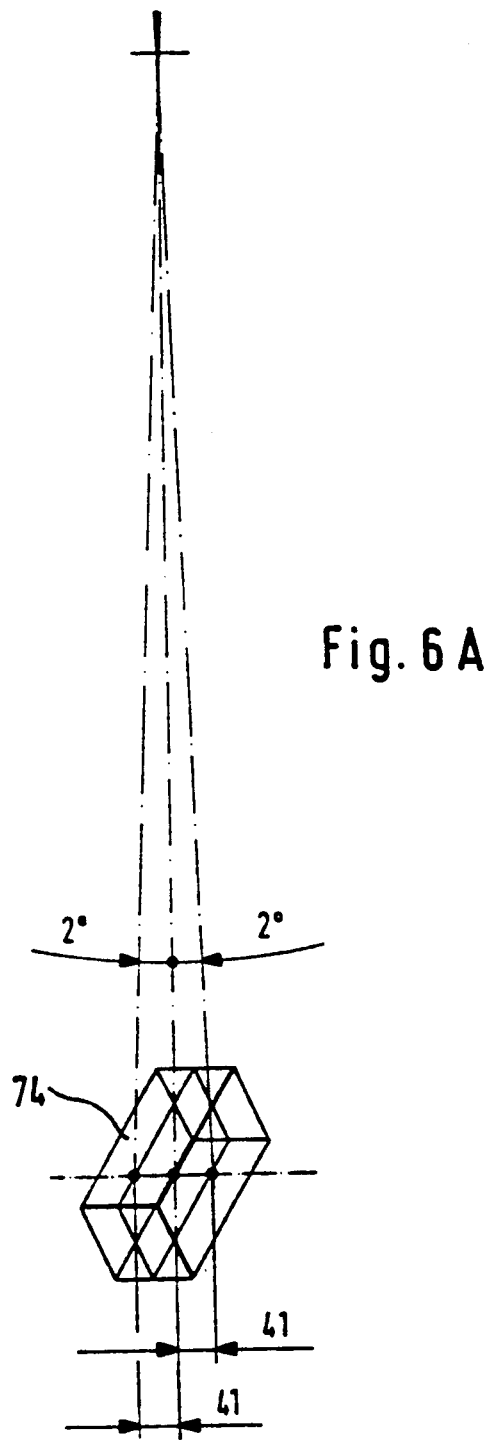

FIG. 6 illustrates diagrammatically the mobility of the blast connection according to the present invention in the hot state for an axial misalignment tolerance of 2° between the tapered tube and the lower connection piece. The figure shows more particularly the movements of the center 0 of the articulation between the nozzle and the tuyere following the movements of the wall of the furnace, and that of the center Y of the flange 50 relative to an imaginary fixed point X, assuming that the bustle pipe and the tube 36 remain stationary. In the example illustrated of a distance of 2364 mm between 0 and Y, and of a misalignment tolerance of 2°, the maximum deviation of the center 0, in a vertical plane, is represented by the quadrilateral 72. Any movement inside this quadrilateral 72 takes the form only of an axial displacement of the point Y. Taking into account the fact that the point 0 can also be displaced axially, in other words in the plane of FIG. 6, the mobility quadrilateral 72 becomes a parallelepiped 74 as illustrated in FIG. 6A. In practice, this parallelepiped is a cube of edge length of the order of 80 mm, which corresponds to a mobility of the point Y of the order of 85 mm.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for injecting air into a shaft furnace, comprising:

a tubular tapered connector having external armoring and an internal refractory lining, having an inlet end adapted for securing the tapered tubular connector in fluid flow connection with a source of preheated air and having a narrowed outlet end;

a tubular gooseneck connector having external armoring and an internal refractory lining, having an inlet end which slidably receives the outlet end of the tapered connector to allow relative axial displacement therebetween, having an outlet end and having a bent portion between the inlet and outlet ends thereof;

tension rod means for mechanically securing the gooseneck connector to the tapered connector while allowing axial displacement therebetween;

an expansion bellows for sealingly connecting the outlet of the tapered tubular connector and the inlet end of the gooseneck tubular connector;

means for limiting relative radial deflection between the tapered tubular connector and the gooseneck tubular connector;

a nozzle having an inlet end in fluid flow connection with the outlet end of the gooseneck connector and having an outlet end;

a tymp or tuyere having an inlet end in fluid flow connection with outlet end of the nozzle; and ball and socket joint means for sealingly connecting the nozzle and the tymp or tuyere.

2. The device of claim 1, wherein the means for limiting relative radial deflection allows radial deflection of up to 2° between the tapered connector and the gooseneck connector.

3. The device of claim 2, wherein the tapered connector further comprise a first radial flange surrounds the inlet end of the tapered connector, the gooseneck connector further comprises a second radial flange surrounds the inlet end of the gooseneck connector, and wherein the means for limiting relative radial deflection comprises a pair of flanks which are each integral with first radial flange, extend along the expansion bellows and are received within recesses defined in the second radial flange.

4. The device of claim 1, further comprising a radial flange surrounding the inlet end of the gooseneck connector and wherein the means for limiting relative radial deflection comprises an internal guide ring integral with the radial flange and surrounding the tapered connector.

5. The device of claim 1, wherein the ball-and-socket means comprises tension rod means for applying a tensile force between the furnace wall and the nozzle.

6. The device of claim 1, wherein the nozzle extends along longitudinal axis, wherein the tension rod means comprise a tension rod and spring assembly which extends axially upwardly from the nozzle toward the furnace wall and wherein the axis of the tension rod and spring assembly forms an acute angle α with the axis of the nozzle.

7. The device of claim 1, wherein the ball-and-socket means comprises tension rod means for applying a tensile force between the furnace wall and the outlet end of the gooseneck connector.

8. The device of claim 6, wherein the nozzle extends along longitudinal axis, wherein the tension rod means comprise a tension rod and spring assembly which extends axially upwardly from the gooseneck to the furnace wall and wherein the axis of the tension rod and spring assembly forms an acute angle α with the axis of the nozzle.

* * * * *